United States Patent
Blayvas

(10) Patent No.: US 8,878,968 B2
(45) Date of Patent: Nov. 4, 2014

(54) IMAGE PROCESSING BASED ON MOVING LENS WITH CHROMATIC ABERRATION AND MONOCHROMATIC IMAGE SENSOR

(71) Applicant: Broadcom Corporation, Irvine, CA (US)

(72) Inventor: Ilya Blayvas, Ramat Gan (IL)

(73) Assignee: Broadcom Corporation, Irvine, CA (US)

( * ) Notice: Subject to any disclaimer, the term of this patent is extended or adjusted under 35 U.S.C. 154(b) by 163 days.

(21) Appl. No.: 13/628,357

(22) Filed: Sep. 27, 2012

(65) Prior Publication Data

US 2014/0085515 A1  Mar. 27, 2014

(51) Int. Cl.
*H04N 5/335* (2011.01)

(52) U.S. Cl.
USPC .......................................... 348/272; 348/222.1

(58) Field of Classification Search
CPC ........................................................ H04N 5/234
USPC .......... 348/207.99, 272–280, 234–237, 222.1
See application file for complete search history.

(56) References Cited

U.S. PATENT DOCUMENTS 7,557,969 B2 * 7/2009 Sone .............................. 358/504
2012/0133999 A1 * 5/2012 Lin et al. ....................... 358/509

* cited by examiner

*Primary Examiner* — Tuan Ho
(74) *Attorney, Agent, or Firm* — McDermott Will & Emery LLP

(57) ABSTRACT

Embodiments of imaging devices of the present disclosure obtain color images from a monochromatic image sensor based on a series of several images taken at different focal positions of an optical imaging lens possessing a chromatic aberration.

20 Claims, 10 Drawing Sheets

| | PN 520 | |
| --- | --- | --- |
| PW 550 | P 510 | PE 530 |
| | PS 540 | |

FIG. 5

IMAGE PROCESSING BASED ON MOVING LENS WITH CHROMATIC ABERRATION AND MONOCHROMATIC IMAGE SENSOR

BACKGROUND

In conventional color digital imaging, a pixel color value is detected due to a color mosaic deposited on a surface of an image sensor, which is known in the art as the Bayer mosaic. The use of the Bayer mosaic for color separation results in different colors being detected in different pixels of the image sensor and, therefore, different points of the captured image, which results in color aliasing. Color aliasing is a phenomenon in which the colors of the fine details of the image are distorted, or false colors are detected along the edges and fine details of the image.

To decrease the phenomenon of color aliasing, an optical low-pass filter (OLPF) is usually added to a digital camera. This filter partially blurs the image, decreasing the color aliasing phenomenon, but simultaneously decreasing the image resolution. Furthermore, the OLPF is usually based on polarizing properties of optical birefringence materials and fails to properly work under the conditions of polarized illumination, thereby limiting use of polarization techniques and degrading the image quality under the polarized illumination.

Furthermore, in conventional digital cameras, the image formed on the image sensor should be simultaneously sharp for all the colors of the spectrum. Therefore, great efforts are taken to correct the chromatic aberrations of the lenses, which is an intrinsic property of glass lenses. However, correction of chromatic aberrations results in significantly more expensive, bigger and bulkier lenses, and degradation of other optical properties, such as a significant decrease of maximum aperture, an increase of the minimal focal length, etc.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 is a diagram illustrating pixels of an image sensor of the imaging device of FIG. 1 for obtaining focus measures in accordance with embodiments of the present disclosure.

DETAILED DESCRIPTION

This disclosure provides systems and methods for automatically utilizing sequential image captures in an image processing pipeline of an imaging device such as, for example a digital stills or video camera, to obtain pixel color values. Embodiments in accordance with the present disclosure use a chromatic aberration of a moving optical imaging lens to obtain a color image from a sequence of images captured by a monochromatic image sensor at different lens positions.

Therefore, to acquire image data, a digital imaging device may include an image sensor that provides a number of light-detecting elements (e.g., photo-detectors) configured to convert light detected by the image sensor into an electrical signal. In accordance with embodiments of the present disclosure, the image sensor does not need to include a color filter mosaic in order to capture color information. Therefore, such a monochromatic image sensor gains in energy coming into the sensor and provides improved resolution over an image sensor having a color filter mosaic or array.

Furthermore, the disclosed system uses an optical imaging lens possessing a chromatic aberration. Note, refractive materials used to build optical lenses (glass and transparent plastics) naturally have color dispersion (dependence of refractive coefficient on the light wavelength) and great efforts are usually taken to overcome lens chromatic aberrations. As it is known by one skilled in the art, relaxing the requirement of absence of chromatic aberrations (i.e. allowing the lens to possess the chromatic aberration) results in significant improvements of other optical properties (e.g., increase of the maximum aperture, decrease of the minimum possible focal length, decrease of lens size, weight, price, etc.).

In accordance with embodiments of the present disclosure, a sequence of sub-frames is captured at different focal positions of the optical imaging lens, while the lens is swept in the range of preliminary defined relevant positions. These sub-frames will correspond to the sweep over different wavelengths and different distances to the object in a scene being captured. Processing the acquired sequence of sub-frames allows for determining for each image pixel its specific color composition (or color spectrum) and distance to the corresponding object point.

Figure 1:
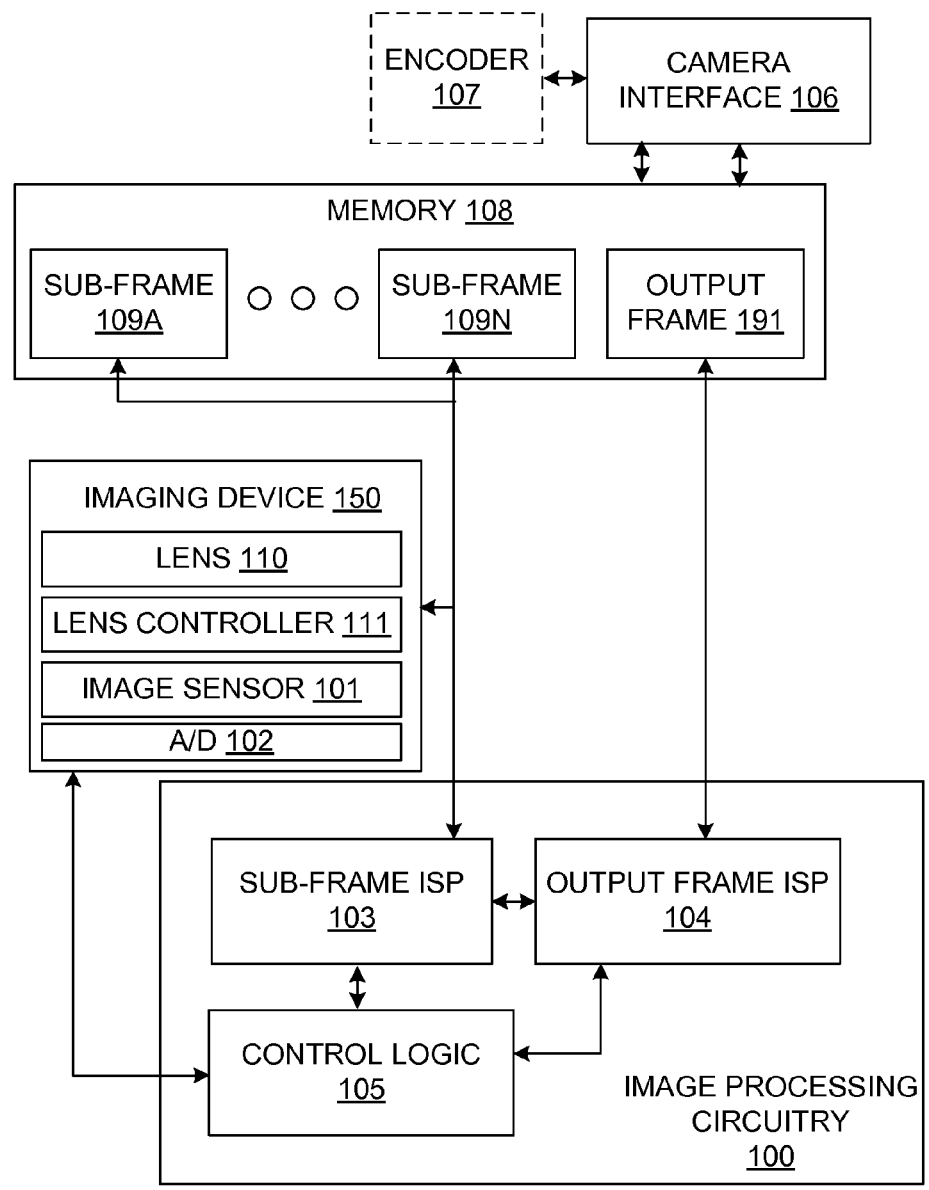
FIG. 1 is a block diagram of one embodiment of an imaging device having image processing circuitry according to the present disclosure.

Referring to FIG. 1, a block diagram of one embodiment of an image processing circuitry 100 is shown for an imaging device 150. The illustrated imaging device 150 may be provided as a digital camera configured to acquire both still images and moving images (e.g., video). The imaging device 150 may include an optical imaging lens 110, a lens controller 111, a monochromatic image sensor 101, and analog to digital (A/D) converter 102. Internal filters may be employed to block ultraviolet and infrared wavelengths, limiting transmittance spectrum to the visible wavelengths such as between 400 nm and 700 nm, or thereabouts.

The lens controller 111 is configured to adjust at least the focal position of the lens 110. As a non-limiting example, the lens controller 111 may include a sonic coil actuator, a piezo-electric actuator, and/or other type of motor as can be appreciated. The image sensor 101 may be configured to capture and convert light into electrical signals. Also, the image sensor 101 may include a CMOS (complementary metal-oxidesemiconductor) image sensor (e.g., a CMOS active-pixel sensor (APS)), a CCD (charge-coupled device) image sensor, or other type of image sensor as can be appreciated.

In a digital imaging system, the image sensor 101 may consist of an array of photo-detectors (pixels), such that the image sensor 101 forms a focal plane for the lens 110 and captures the image of an object. To obtain a color image, image sensor 101 acquires images at several different lens positions. In particular, each lens position corresponds to specific wavelength that will form a sharp image at a given distance to the object. This constraint, together with cutting out of infrared and ultraviolet parts of the transmittance spectrum allows for obtaining the color signature for each pixel, and then reconstructing both the color spectrum and object distance for each image pixel.

In some embodiments, the image processing circuitry 100 may include various subcomponents and/or discrete units of logic that collectively form an image processing "pipeline" for performing each of various image processing steps. Although the subcomponents are shown as image signal processors (ISPs), the function of the subcomponents may be implemented using other hardware (e.g., digital signal processors (DSPs) or application-specific integrated circuits (ASICs)), software, or via a combination of hardware and software components. The various image processing operations may be provided by the image processing circuitry 100.

The image processing circuitry 100 may include sub-frame ISP(s) 103, an output frame ISP 104, and control logic 105, among others. The analog image signals captured by the image sensor 101 are passed to an analog-to-digital (A/D) converter 102 for conversion into binary values that can be processed by the sub-frame ISP 103. Control logic 105 of a main CPU or processor controls and regulates operation of the imaging device 150.

In one embodiment, the optical imaging lens 110 forms an image on the image sensor 101, and the image is acquired by the image sensor 101, digitized by the A/D converter 102, and transmitted to the sub-frame ISP 103, where it is further processed and stored in memory 108. In particular, the lens position is swept through a focus range, and during the position sweep, multiple sub-frames images are taken, processed by sub-frame ISP 103, and stored in the memory 108. As such, in one embodiment, during acquisition of N sub-frames, the lens 110 periodically moves through its entire focus range, therefore each of the N sub-frames is acquired at its specific focal distance.

After finishing the focus sweep, the output frame ISP 104 processes the set of sub-frames 109A-N from memory 108, finds the color signatures of the pixels, and from the color signatures, calculates the RGB or hyper-spectral color components and the distance to the object in the captured scene for each pixel.

Figure 2:
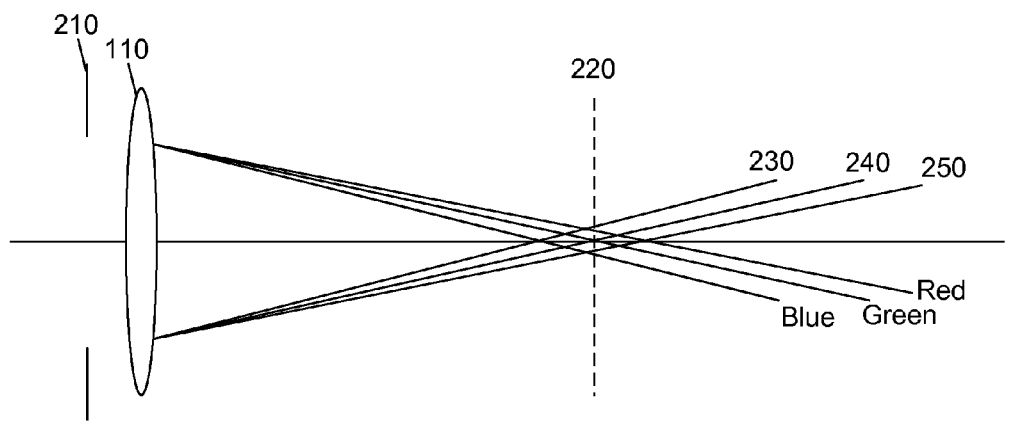
FIG. 2 is a diagram of axial chromatic aberration of an exemplary optical imaging lens of the imaging device in accordance with embodiments of the present disclosure.

For example, FIG. 2 shows an axial chromatic aberration of an exemplary optical imaging lens 110 (having diaphragm 210 with lens aperture), when blue wavelengths 230 are focused at the closest distance from the lens 110, green wavelengths 240 are focused at the middle range, and red wavelengths 250 are focused at the furthest distances from the lens 110. Therefore, by moving the lens 110 along the optical axis, different wavelengths are respectively brought in focus at the image plane 220 at different focal distances. Accordingly, when an image is in focus for red wavelengths, the image is out of focus for green and blue wavelengths and vice versa.

Figure 3:
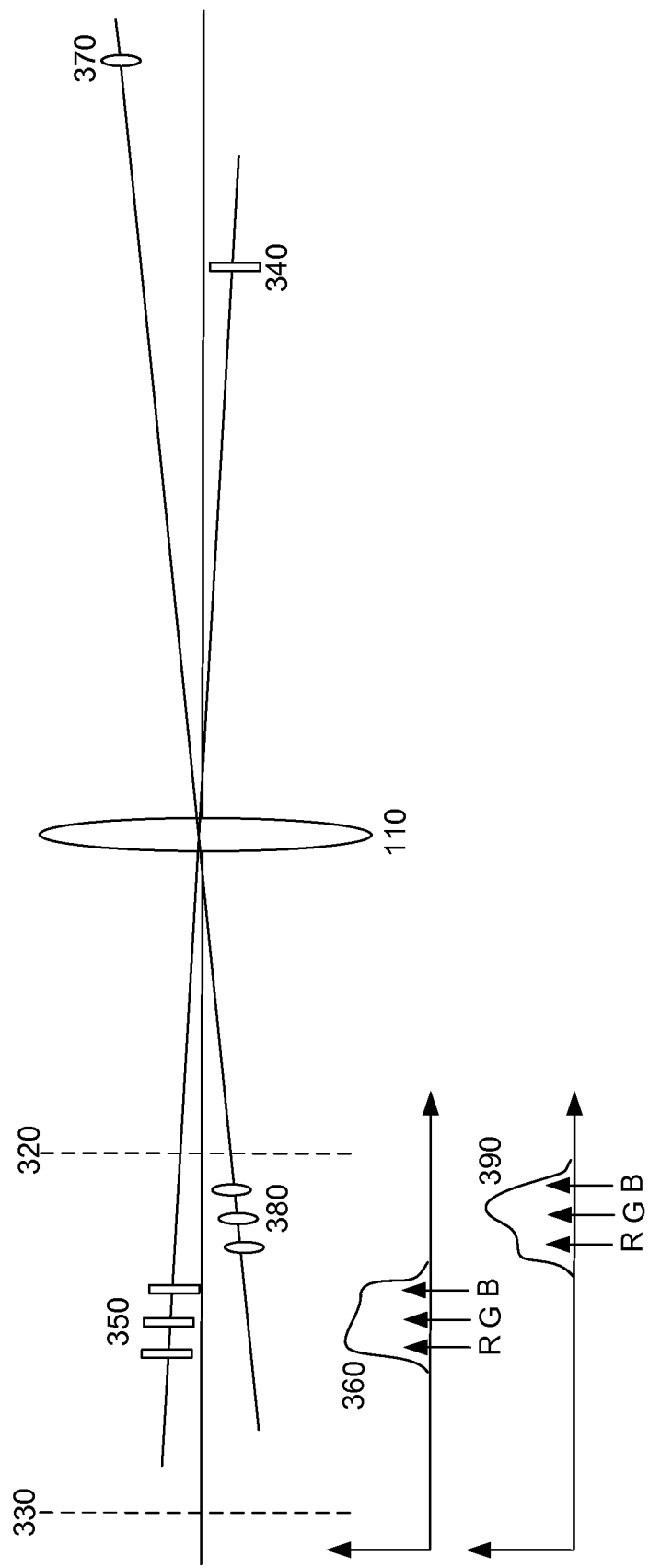
FIG. 3 is a diagram depicting operation principles of the imaging device of FIG. 1 in accordance with embodiments of the present disclosure.

Next, FIG. 3 further illustrates operation principles of an exemplary embodiment of the imaging device 150. The figure depicts chromatic aberration characteristics of an exemplary optical imaging lens 110. Here, plane 320 and plane 330 are limiting image planes, where plane 320 is the plane where the shortest wavelengths of infinitely remote objects will be in focus and plane 330 is the image plane where the longest wavelengths of the closest objects will be in focus. In this example, object 340, produces images at a sub-range of image planes 350, and their color signature 360 is depicted. Correspondingly, an exemplary object 370 produces images 380, and their color signature 390 is depicted. Therefore, in accordance with the present disclosure, multiple images or sub-frames 109A-N may be captured within a defined focus or lens position range to allow for a color signature 360, 390 to be generated for each pixel of the image sensor 101.

Figure 4:
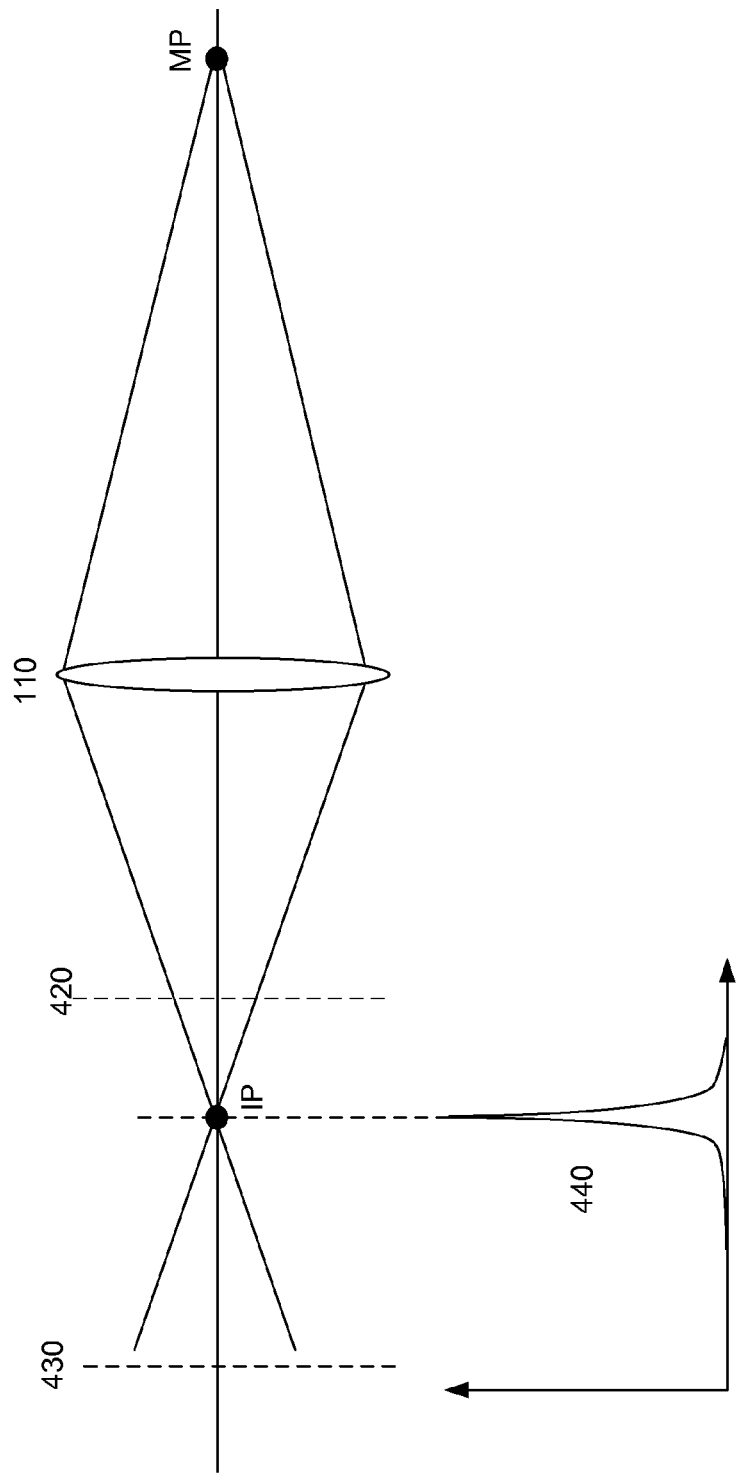
FIG. 4 is a diagram of a spectral response of a single monochromatic point as part of an illustration of operation principles of the imaging device of FIG. 1 in accordance with embodiments of the present disclosure.

As an example, FIG. 4 shows the spectral response of a single monochromatic point MP, where point MP produces a sharp image IP at a single image plane, corresponding to its distance from the lens 110 and its wavelength. As the lens 110 is moved within a focus range defined by limits 420 and 430, less sharp or blurry images will be produced. Therefore, a color signature 440 along the moving image plane (or focus range) will have a single sharp peak at a maximum intensity value and then lesser values at focal positions within the focus range (for the single monochromatic point in this example). For a point having multiple colors, a color signature may be obtained with multiple peaks corresponding to different wavelengths of the colors captured.

As a result, from the color signature 360, 390 for a pixel, multiple optimal color values (e.g., R, G, B) may be selected from the color signature corresponding to color wavelength positions within a spectrum, as demonstrated in FIG. 3. As an example, the blue component B of the spectrum is focused at a point closest to the lens 110, the red component R of the spectrum is focused at a point farthest from the lens 110, and the green component G of the spectrum has its focal point approximately halfway between the red and blue focal points characterized by the peaks of the curves of the spectrum. Accordingly, the color spectrum of each pixel is dependent upon and may be determined from the corresponding lens positions.

Figure 5:
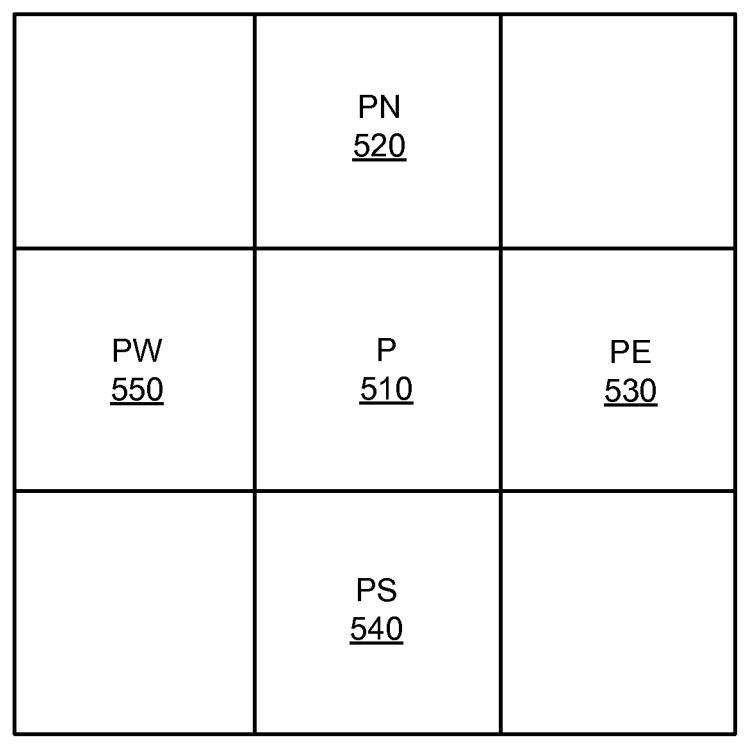

To generate the color signature, focus measures may be computed for an individual pixel across the focus range. For example, FIG. 5 shows a single pixel (P) 510 of the monochromatic image sensor 101, in an exemplary embodiment. Four neighbors of the pixel are denoted as PN 520, PE 530, PS 540 and PW 550, and an exemplary embodiment of the focus measure at the pixel P at a particular focal distance is the sum of absolute differences of the pixel's value with the values of its four nearest neighbors:

$$\text{Focus measure at } P = \text{abs}(P - ((PS + PE + PN + PW)/4)).$$

Figure 6:
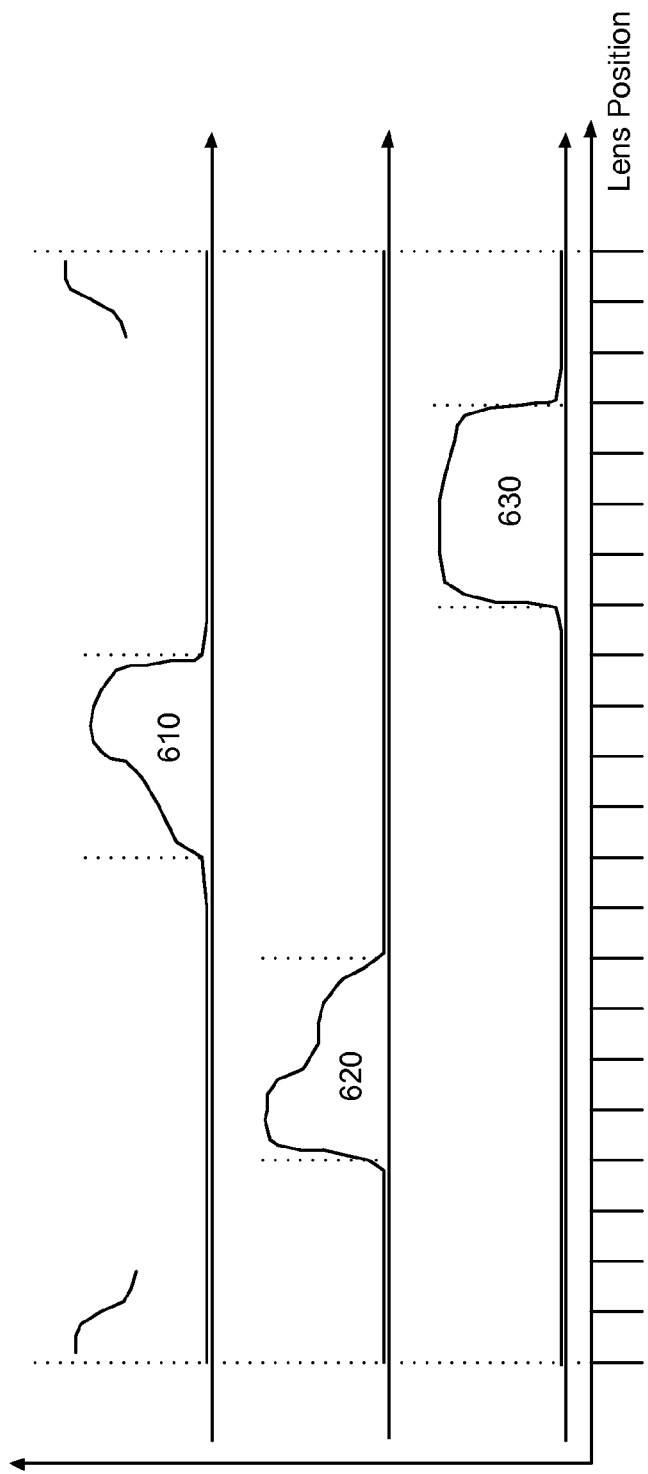
FIG. 6 is a diagram of exemplary color signatures obtained during a lens position sweep of the optical imaging lens of the imaging device of FIG. 1 in accordance with embodiments of the present disclosure.

As understood in the art, focus measures are more adept to identify image quality or sharpness as the level of details and textures in an image scene increase. FIG. 6 shows an example of focus measures calculated and measured at three individual pixels along a set of the sub-frames captured while sweeping the lens 110. It is noted that each pixel of the image sensor 101 has a specific color signature. Accordingly, the top plot 610 may be representative of focus measurements across sub-frames for a first pixel of the image sensor 101, the middle plot 620 may be representative of focus measurements across sub-frames for a second pixel of the image sensor 101, and the bottom plot 630 may be representative of focus measurements across sub-frames for a third pixel of the image sensor 101. From the focus measurements, R, G, B color component values may be determined for the individual pixels. In alternative embodiments, where additional color component values are used, such as hyper-spectral values, color signatures generated from the focus measures may encompass measurements from other sub-frames. Accordingly, the particular distribution of the sub-frames used to obtain color signatures can be based on the focusing spread of the optical imaging lens.

Figure 7:
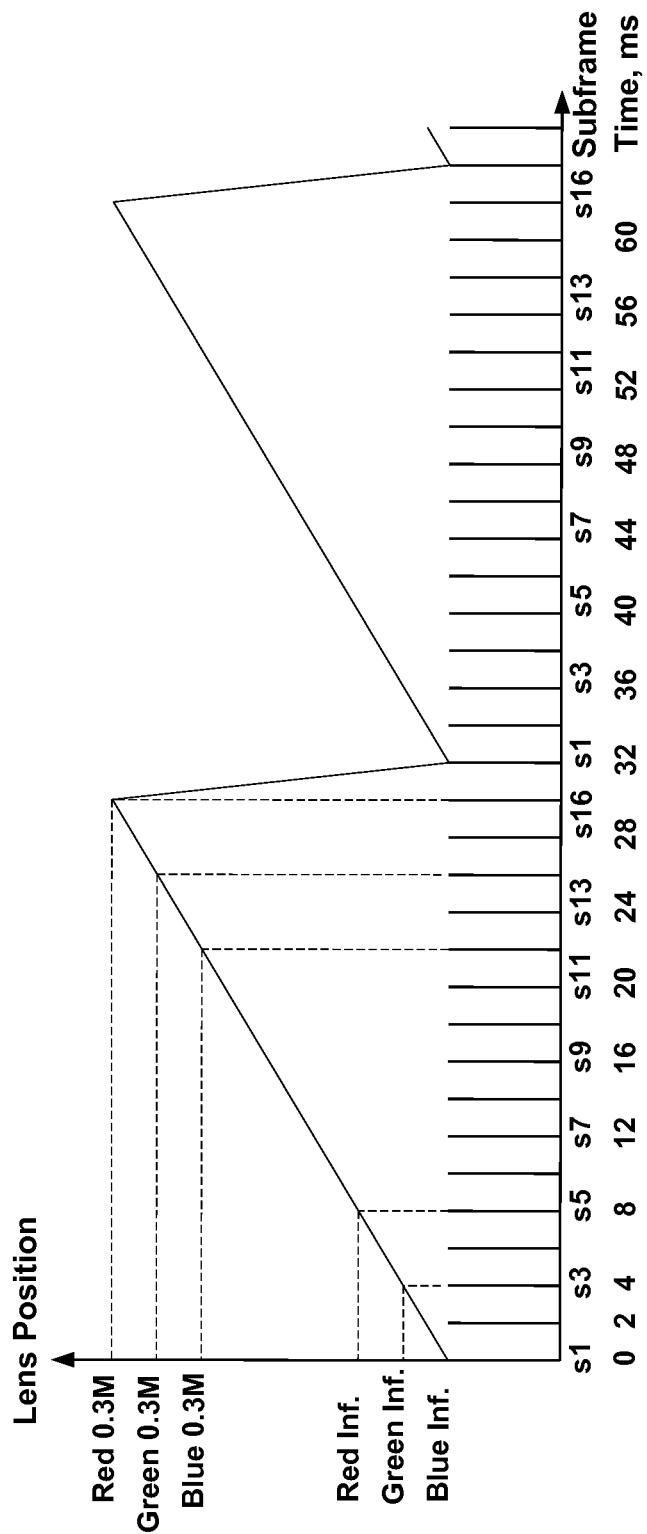
FIG. 7 is a diagram depicting an exemplary time sequence for capturing sub-frames at corresponding lens positions in accordance with embodiments of the present disclosure.

Referring now to FIG. 7, the figure illustrates an exemplary time sequence or series of the sub-frames and corresponding lens positions to help demonstrate how an output frame is formed from the sub-frames, in one embodiment. Here, it is assumed that the duration of each output frame is divided into 16 sub-frames (each having a duration of 2 ms) corresponding to the lens. In different scenarios and/or embodiments, it is understood that frame rate, number of sub-frames in the frame, and sub-frame focal positions may be modified, as should be obvious to one skilled in the art.

In one embodiment, the lens controller 111 moves the lens 110 from a near focal position to a far focal position during acquisition of N sub-frames, and cyclically repeats this movement. In the example above, the lens 110 sweeps the position range during 16 sub-frames. Therefore, the N sub-frames span the entire focus range and spectral range, and a single output frame 191 (FIG. 1) is formed by output frame ISP 104 from N sub-frames. The sub-frames 109A-N (FIG. 1) are stored in the memory 108, during acquisition of each frame. Then, the sub-frames are read from the memory 108 by output frame ISP 104, and from multiple intermediate sub-frames, a color signature is computed for each pixel of the image sensor 101 used to acquire the sub-frames 109A-N by the output frame ISP 104. As a result, color values may be calculated for each of the pixels from the color signatures. For example, output frame ISP 104 may generate pixels of three (or more for hyper-spectral images) colors (e.g., red, green, and blue) at all pixel positions. Accordingly, an output image or frame 191 may be generated that includes a full array of pixel data values that corresponds to the images captured by image sensor 101.

In various embodiments, the frames are taken from the memory 108 for further processing by applications, permanent storage, displaying, video-output, compression or any other purpose by camera interface 106. The imaging device 150 might have other options and modifications not shown on FIG. 1, obvious to anybody skilled in the art and omitted here for the sake of brevity and/or clarity as less relevant to this disclosure.

Referring back to FIG. 1, sub-frames 109A-N produced by the sub-frame ISP 103 may be provided to the output frame ISP 104 for additional processing prior to being output through the camera interface 106 (e.g., displayed on a display device, output to a storage device, etc.), or sent to the memory 108. The output frame ISP 104 receives the sub-frames 109A-N, either directly from the sub-frame ISP 103 or from memory 108, and may provide for additional processing operations described below in order to produce the output frame 191. The output frame 191 produced by the output frame ISP 104 may then be sent to memory 108 where they may be accessed by the camera interface 106.

Further, in some implementations, an encoder 107, such as a compression engine, etc., may process the output frame 191 prior to it being read by the camera interface 106. The encoder 107 may be a JPEG (Joint Photographic Experts Group) compression engine for encoding still images, an H.264 compression engine for encoding videos, and/or other type of encoder. Also, it should be noted that the camera interface 106 may also receive raw image data from the memory 108.

The control logic 105 may include a processor 1020 (FIG. 10) and/or microcontroller configured to execute one or more routines (e.g., firmware and/or software) that may be configured to determine control parameters for the imaging device 150, as well as control parameters for the output frame ISP 104. By way of example only, the control parameters may include sensor control parameters, camera flash control parameters, lens control parameters (e.g., focal distance for focusing or zoom), or a combination of such parameters for the image sensor(s) 101. The control parameters may also include image processing commands, such as autowhite balance, autofocus, autoexposure, and color adjustments, as well as lens shading correction parameters for the output frame ISP 104.

Next, a general description of the operation of the various components of the imaging device 150 is provided. To begin, an operator of the imaging device 150 selects a mode of operation for the imaging device 150 and initiates the capture of raw image data by the image sensor 101. In one mode, a plurality of raw frames is captured at a different focal position of the lens 110. By taking multiple images sequentially and in rapid succession relative to the speed of the scene, the captured scene will be substantially similar in each image. The focal position of the lens 110 may be controlled by control logic 105. Accordingly, the control logic 105 may cause the lens controller 111 to move the lens 110 continuously through the focus range while the image sensor 101 captures images along the way. In some embodiments, the focus range may be less than the complete focus range of the lens 110 based upon aperture size of the imaging device 150 (controlled by a lens diaphragm) through which light enters and is focused by the lens 110.

Upon receiving the raw image data, the sub-frame ISP 103 may perform one or more image processing operations. The sub-frames 109A-N produced by the sub-frame ISP 103 may then be provided to the output frame ISP 104 for additional processing, including defining color pixel values for an output frame 191 or image, prior to being output through the camera interface 106 (e.g., displayed on display device), or to the memory 108. The output frame ISP 104 receives the "front-end" processed data, either directly from the sub-frame ISP 103 or from memory 108, and may perform one or more of several possible operations discussed below.

By taking multiple images sequentially and in rapid succession relative to the speed of the scene, image processing in the output frame ISP 104 may then take the sub-frames 109A-N and generate color pixel values based upon color signatures obtained from the sub-frames 109A-N. To this end, the output frame ISP 104 creates an output frame 191 of the scene using the color pixel values selected from the color signatures for the array of pixels of the image sensor 110. Focus measures used to construct the color signatures may be evaluated using a sum of absolute differences of a pixel value with its nearest neighbors, Fourier analysis, cosine transforms, edge detection, and/or techniques as can be appreciated. The resulting output frame 191 has improved resolution beyond any one of the individual sub-frames 109A-N.

As previously mentioned, embodiments of the imaging device 150 may employ modes of operation that are selectable from interface elements of the device. Interface elements may include graphical interface elements selectable from a display or mechanical buttons or switches selectable or switchable from a housing of the imaging device 150. In one embodiment, a user may activate an enhanced mode of operation, where multiple images are captured and used to produce an image with enhanced resolution and color accuracy that may be viewed or saved in memory 108.

Figure 8:
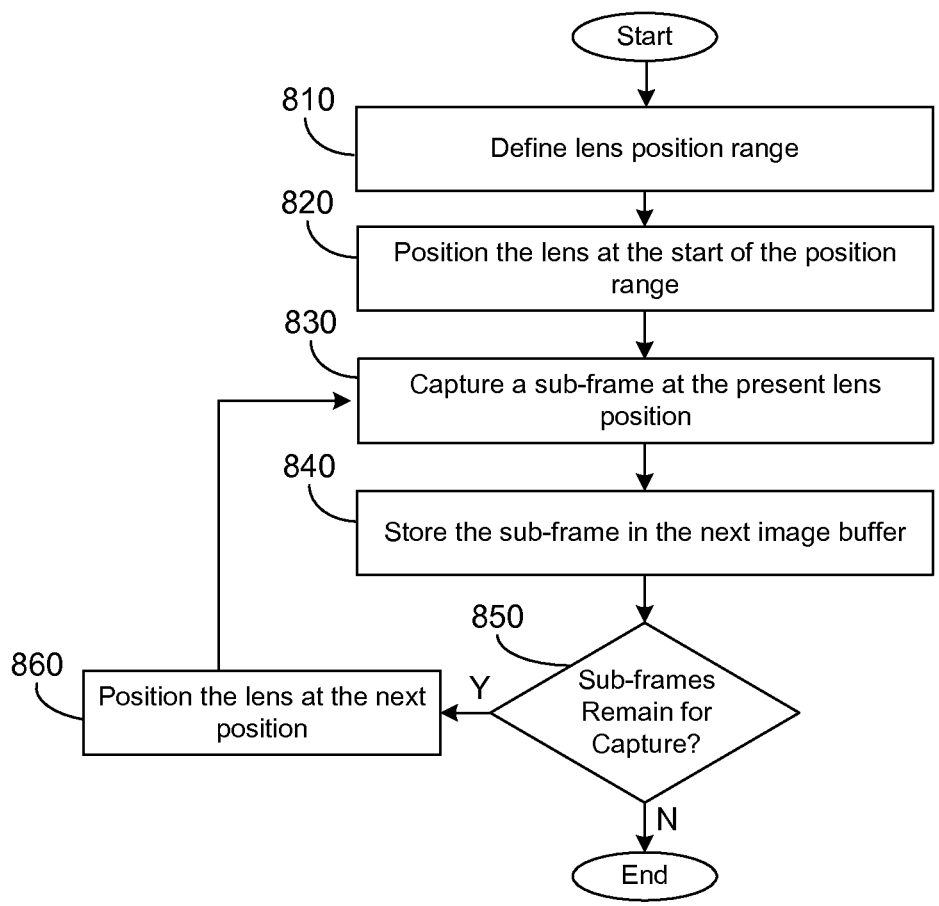
FIGS. 8-9 are flow chart diagrams depicting various functionalities of embodiments of image processing circuitry of FIG. 1.

Referring next to FIG. 8, shown is a flow chart that provides one example of the operation of a portion of the control logic 105 (FIG. 1) according to various embodiments. It is understood that the flow chart of FIG. 8 provides merely an example of the many different types of functional arrangements that may be employed to implement the operation of the portion of the control logic 105 as described herein. As an alternative, the flow chart of FIG. 8 may be viewed as depicting an example of operations or actions of a method implemented in the electronic device 1005 (FIG. 10) according to one or more embodiments.

Beginning in block 810, the control logic 105 determines a lens position range to be used to capture a sequence or series of sub-frames 109A-N (FIG. 1). The lens position range may be the complete focus range of a lens 110 (FIG. 1) or the range may be limited to a shorter range. As a non-limiting example, using a shorter range may be appropriate if the aperture is large and the depth of focus for the objects in a scene is shallow.

Next, in block 820, the control logic 105 instructs the lens controller 111 (FIG. 1) to position the lens 110 at the start of the lens position range. Then, in block 830, the control logic 105 instructs the image sensor 101 (FIG. 1) to capture a sub-frame 109 at the present lens position. Subsequently, in block 840, the control logic 105 may store the captured sub-frame 109A-N in a memory 108 (FIG. 1). Next, in block 850, the control logic 105 may determine if further sub-frames 109A-N remain to be capture for a given sequence. If all the sub-frames 109A-N for a sequence has been captured, execution of this portion of the control logic 105 ends as shown.

Alternatively, if additional sub-frames 109A-N remain to be captured, in block 860, the control logic 105 positions the lens 110 at the next lens position and execution of the control logic 105 returns to block 830. In some embodiments, the lens 110 may continuously move during the capture process. In these embodiments, the control logic 105 in block 860 may not move the lens into position, but may instead determine the current position of the lens 110.

Figure 9:
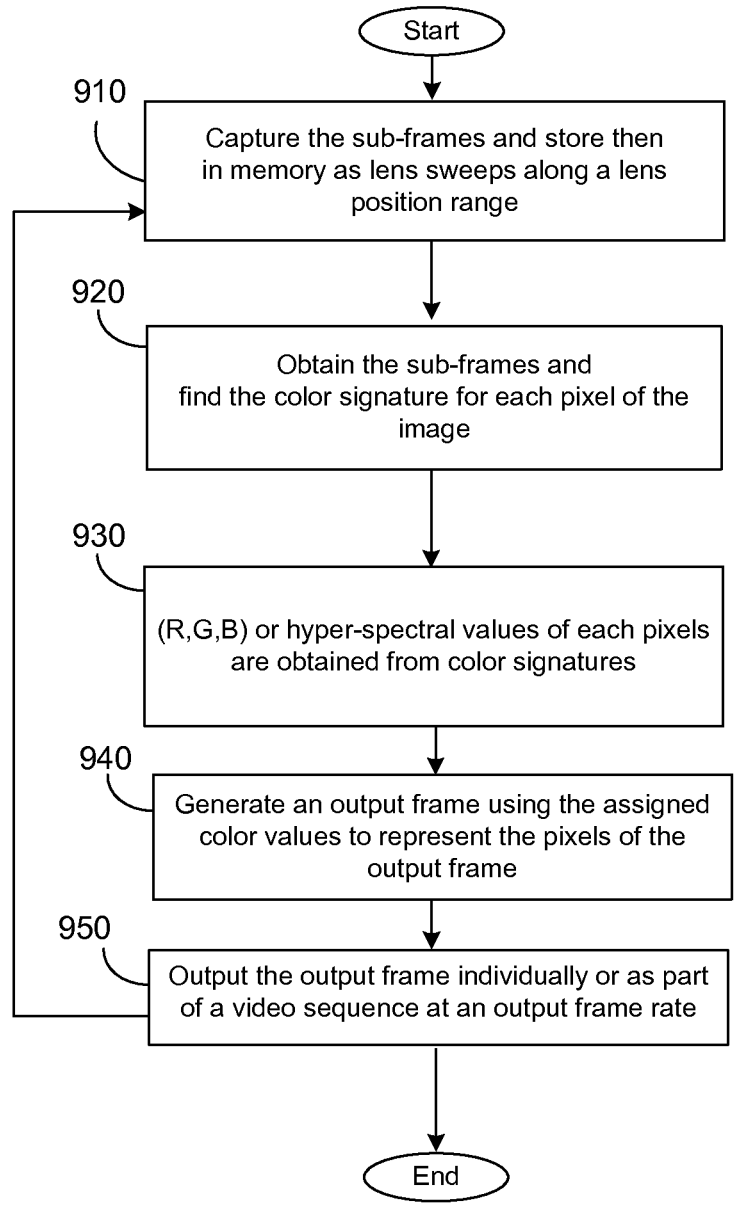

Next, referring to FIG. 9, shown is a flow chart that provides an additional example of the operation of a portion of sub-frame ISP 109 and/or output frame ISP 104 according to various embodiments. Beginning in block 910, the sub-frame ISP 109 may obtain captured sub-frames 109A-N (FIG. 1) and store the sub-frames in memory 108 (FIG. 1) and/or sub-frame ISP 109 (FIG. 1) as an optical imaging lens 110 is moved or swept along a defined lens position range. After the sweep is finished, the output frame ISP 104 obtains the sub-frames 109A-N (e.g., from memory 108) and finds or generates a color signature for each pixel of the image, in block 920. Focus measures used in defining the color signature may be carried out using a sum of absolute differences of a pixel value with its nearest neighbors, Fourier analysis, cosine transforms, edge detection, and/or techniques as can be appreciated. Also, the number of neighbors considered to define the focus measures may be different in different embodiments. In some embodiments, sub-frames in which a focus measure of the pixel exceeds a defined threshold are determined and used to obtain a color component value and distance to a corresponding object point for a pixel focus measure exceeding the defined threshold.

Accordingly, in block 930, for the pixel, color component values ((R, G, B) or hyper-spectral values) of each image pixel are defined or obtained from the color signatures. For example, values for red, blue, and green components may be defined that correspond to the image pixel captured by the image sensor pixel. The component values can be a measure of contrast or intensity for the output frame. The value could also be the edge sharpness, energy in high spatial frequencies, a combination of the edge sharpness and a transfer function at the image over a range of spatial frequencies, or similar measure known to one skilled in the art.

In general, the numeric values produced for the red, blue, and green components are related to image quality or sharpness at wavelengths over the range of interest. Accordingly, output frame ISP 104 can format image data output as a plurality of data words, where each data word corresponds to an image pixel. A data word may include multiple data portions that correspond to the various color components or channels for an image pixel. Any number of bits may be used for each color channel, and the data word may have any length.

Then, in block 940, the output frame ISP 104 generates an output frame 191 using the assigned color values to represent the image pixels of the output frame 191. Therefore, the output frame 191 individually or as part of a video sequence may be output at an output frame rate, in block 950. Thereafter, this portion of the execution of the output frame ISP 104 ends as shown.

As previously mentioned, many conventional color cameras and imagers are based on covering of the image sensor with color mosaic pattern. This color mosaic pattern (e.g., Bayer) absorbs significant amount of light, decreasing the light sensitivity and increasing the noise. For example, assuming a RGGB (Red-Green-Green-Blue) Bayer mosaic is used, each pixel of a raw image contains only the information of the single color, corresponding to the transition spectrum of the filter above it (Red/Green or Blue). Here, a spectrum of two other colors is absorbed by the color filter, decreasing the amount of light reaching the sensor by 70% or more, thereby decreasing the low-light sensitivity of the sensor and increasing the noise.

Also, the color mosaic causes color aliasing, when the fine details of the image cause false colors. Effects of color aliasing necessitates the use of optical low pass filter in conventional cameras, which decreases the image resolution, increases the camera price, and degrades performance via addition of extra optical element and surfaces. In particular, optical low pass filters are based on polarizing birefringent materials, which fail to properly operate under polarized illumination, which further degrades camera performance under the polarized illumination or with polarizing filters.

Further, lens designers have traditionally tried to decrease the chromatic aberrations of the lenses used in conventional cameras, which complicates the design, increases the price, and bears additional degradation of lens optical performance and trade-offs. For instance, color filter arrays can reduce the effective resolution of an image sensor by devoting pixels exclusively to red, green, or blue values. Also, the process of demosaicing introduces artifacts. Further, a color filter array reduces the amount of light that eventually reaches photo-detectors and also reduces an image sensor's spectral sensitivity. In contrast, embodiments of the present disclosure overcome the above limitations.

Furthermore, conventional cameras usually divide continuous color spectrum into only three colors, which leads to multiple limitations. Embodiments of the present disclosure are not limited to only using three colors and can obtain arbitrarily accurate color signatures, allowing obtaining hyper-spectral images with arbitrarily high spectral resolution.

Figure 10:
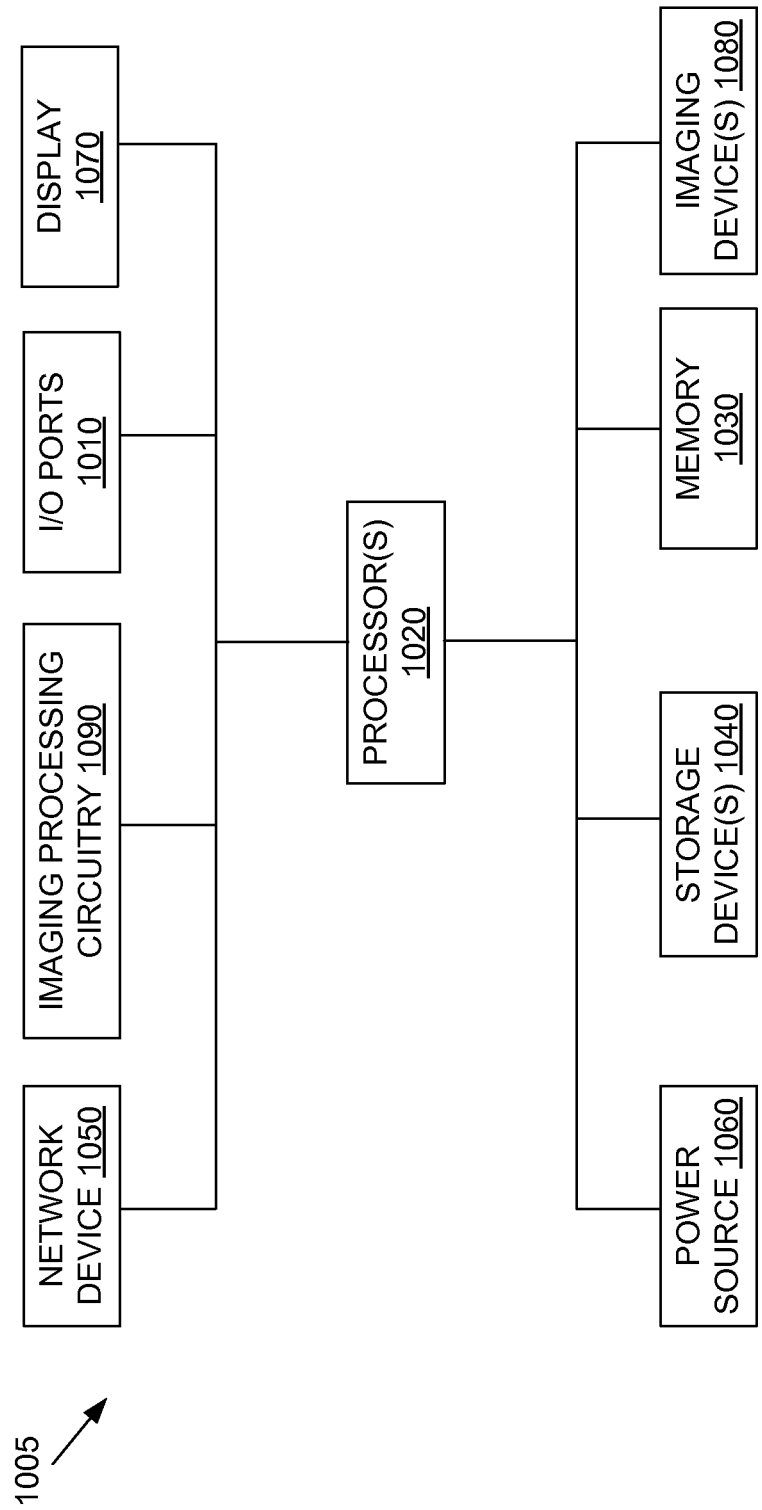
FIG. 10 is a block diagram illustrating an embodiment of an electronic device employing the image processing circuitry of FIG. 1.

Referring to FIG. 10, shown is a block diagram illustrating an example of an electronic device 1005 that may provide for the processing of image data using one or more of the image processing techniques described above. The electronic device 1005 may be any type of electronic device, such as a digital camera, a video camera, a laptop, a desktop computer, a mobile phone, a tablet computer, a digital media player, and/or any device that is configured to receive and process image data, such as data acquired using one or more image sensing components (e.g., image sensor 101).

The electronic device 1005 may include various internal and/or external components which contribute to the function of the device 1005. Those of ordinary skill in the art will appreciate that the various functional blocks shown in FIG. 10 may comprise hardware elements (including circuitry), software elements (including computer code stored on a computer readable medium) or a combination of both hardware and software elements. For example, in the presently illustrated embodiment, the electronic device 1005 may include input/output (I/O) ports 1010, one or more processors 1020, memory device 1030, storage device 1040, networking device 1050, power source 1060, and display 1070. Additionally, the electronic device 1005 may include imaging devices 1080, such as digital cameras or image sensors 101, and image processing circuitry 1090. As will be discussed further below, the image processing circuitry 1090 may be configured to implement one or more of the above-discussed image processing techniques when processing image data. As can be appreciated, image data processed by image processing circuitry 1090 may be retrieved from the memory 1030 and/or the non-volatile storage device(s) 1040, or may be acquired using the imaging device 1080.

It should be understood that the system block diagram of the electronic device 1005 shown in FIG. 10 is intended to be a high-level control diagram depicting various components that may be included in such an electronic device 1005. That is, the connection lines between each individual component shown in FIG. 10 may not necessarily represent paths or directions through which data flows or is transmitted between various components of the electronic device 1005. Indeed, as discussed above, the depicted processor(s) 1020 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU). Note that in an embodiment, two or more of image sensor device 101, A/D 102 (FIG. 1), and processor(s) 1020 may be included together in a single IC chip, such as a CMOS chip, particularly when image sensor device 101 is a CMOS sensor, or may be in two or more separate chips.

Any process descriptions or blocks in flow charts should be understood as representing modules, segments, or portions of code which include one or more executable instructions for implementing specific logical functions or actions in the process, and alternate implementations are included within the scope of embodiments of the present disclosure in which functions may be executed out of order from that shown or discussed, including substantially concurrently or in reverse order, depending on the functionality involved, as would be understood by those reasonably skilled in the art.

In the context of this document, a "computer readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of certain embodiments includes embodying the functionality of the embodiments in logic embodied in hardware or software-configured mediums.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described embodiments of the invention, at least the following is claimed:

1. An imaging device, comprising:
   an optical imaging lens having chromatic aberration, wherein a focal distance of the optical imaging lens is different for different wavelengths;
   a monochromatic image sensor; and
   a lens controller configured to change a focal position of the optical imaging lens to acquire by the monochromatic image sensor a sequence of images at different lens focal positions.

2. The imaging device of claim 1, further comprising:
   an image processor configured to:
      process the sequence of images and determine a focus measure for each pixel of the monochromatic image sensor;
      for each pixel, determine sub-frames within the sequence of images on which the focus measure of the pixel exceeds a defined threshold;
      for each determined sub-frame, obtain a color component value and distance to a corresponding object point for a pixel focus measure exceeding the defined threshold; and
      generate an output frame containing the color component values for each pixel of the monochromatic image sensor.

3. The imaging device of claim 2, further comprising a memory that stores the sequence of images.

4. The imaging device of claim 1, further comprising:
   an image processor configured to form a single output frame from multiple input sub-frames, wherein:
      the sequence of images comprise sub-frames;
      multiple sub-frames are acquired at the different lens focal positions, while the optical imaging lens is swept within a range of lens focal positions.
      for each image pixel in the single output frame, a set of input sub-frames is found in which the image pixel has the greatest sharpness or focus measure; and
      from the lens positions corresponding to set of sub-frames, a color signature, color component values, and object distance are determined for each image pixel of the single output frame.

5. The imaging device of claim 1, wherein the optical imaging lens is swept within a defined focus range within a time interval of a single output video frame, wherein the sequence of images are captured during the time interval to produce a video stream at a constant output frame rate.

6. The imaging device of claim 1, wherein a particular color component value is identified by measuring a sharpness value of an image pixel amongst the different lens focal positions and selecting the particular color component value that corresponds to an optimum sharpness value measured.

7. The imaging device of claim 6, wherein a degree of sharpness of the imaging pixel is measured as a sum of absolute differences with a plurality of neighbor image pixels in an image.

8. The imaging device of claim 1, wherein the image processor is further configured to generate a video based upon a temporal sequence of frames comprising the output frame.

9. A method, comprising:
capturing by a monochromatic image sensor, a plurality of input sub-frames, wherein each of the sub-frames comprises a representation of an object captured at a focal position of a lens having chromatic aberrations, the focal position being different for each of the sub-frames;
generating a color signature for each image pixel of a single output frame from the plurality of input sub-frames; and
defining a color component value to represent the image pixel from the color signature generated.

10. The method of claim 9, further comprising defining a focal range in which to acquire the sub-frames, wherein the lens is moved across the focus range during capturing of the sub-frames.

11. The method of claim 9, wherein the color signature is generated from focus measures applied to the plurality of sub-frames.

12. The method of claim 11, wherein the focus measures comprise computing an absolute difference of an image pixel value with an average value of its nearest neighbors 13. The method of claim 9, further comprising generating the single output frame from the plurality of sub-frames acquired at different lens focal positions.

14. The method of claim 9, further comprising generating a video based upon a temporal sequence of frames comprising the single output frame.

15. The method of claim 9, wherein a particular color component value is identified by measuring a sharpness value of an image pixel amongst different lens focal positions and selecting the particular color component value that corresponds to an optimum sharpness value measured.

16. A non-transitory computer readable medium having a computer program executable by a hardware processor of an imaging device, the computer program comprising:
code that causes a monochromatic image sensor to capture a plurality of sub-frames, wherein each of the sub-frames comprises a representation of an object captured at a focal position of a lens having chromatic aberrations, the focal position being different for each of the sub-frames;
code that generates a color signature for an image sensor pixel photo-detector from the plurality of sub-frames; and
code that defines color component values to represent an image pixel from the color signature.

17. The non-transitory computer readable medium of claim 16, further comprising code that defines a focal range in which to acquire the sub-frames, wherein the lens is moved across the focus range during capturing of the sub-frames.

18. The non-transitory computer readable medium of claim 16, wherein the color signature is generated from the focus measures applied to the plurality of sub-frames.

19. The non-transitory computer readable medium of claim 16, further comprising code that generates an output frame of the object from the sequence of images acquired at different lens focal positions and color component values defined for each image pixel of the output frame.

20. The non-transitory computer readable medium of claim 16, wherein a particular color component value is identified by measuring an intensity value of an image pixel amongst the different lens focal positions and selecting the particular color component value that corresponds to an optimum intensity value measured.

* * * * *